Sept. 5, 1933.  J. K. MATTER  1,925,700

CULINARY ARTICLE

Filed Jan. 2, 1932

INVENTOR
James K. Matter

Patented Sept. 5, 1933

1,925,700

UNITED STATES PATENT OFFICE 1,925,700

CULINARY ARTICLE

James K. Matter, New Kensington, Pa., assignor to The Aluminum Cooking Utensil Company, New Kensington, Pa., a corporation of Pennsylvania Application January 2, 1932. Serial No. 584,459

4 Claims. (Cl. 53—7)

The invention relates to culinary utensils of a general type which may be described as frying molds. More particularly, it relates to frying pan accessories adapted to receive, and mold into shape during cooking, eggs or other foodstuff.

Various devices have been proposed for controlling the shape or contour of griddle-cooked foods, or of poached eggs, but these devices have not been wholly satisfactory and have not met with general favor. For example, fry pans cast in the form of multiple-molds have been proposed but have many inherent disadvantages such as expense of manufacture, difficulty of cleaning and non-adaptability for general use or any use other than the specific use for which designed. Other devices proposed have made necessary the employment of special forms of frying pans and have for that and other reasons proved undesirable.

It is an object of my invention to provide a culinary mold which obviates the foregoing disadvantages and which can be used as accessory to the usual form of frying pan or skillet.

It is another object of my invention to provide a frying mold which is simple and inexpensive to manufacture, and which can be easily handled and cleaned.

A specific object is the provision of a frying mold which not only controls the form or outline of an egg cooked therein, but which also embodies means whereby the yolk of the egg may be centered or held in a predetermined relationship to the white of the egg.

Other objects and advantages will appear from a consideration of the drawing and accompanying description.

Figure 1:
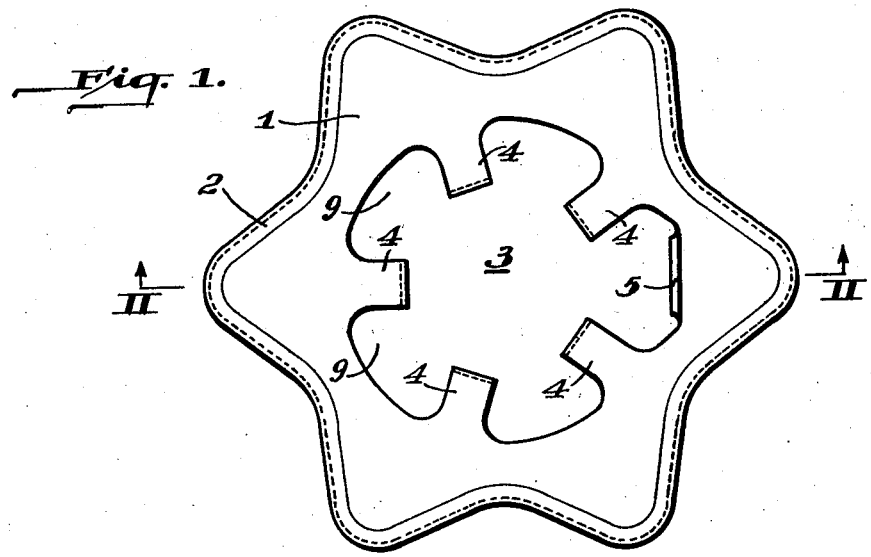
Fig. 1 is a plan view of a mold constructed in accordance with a preferred form of my invention.
Figure 2:
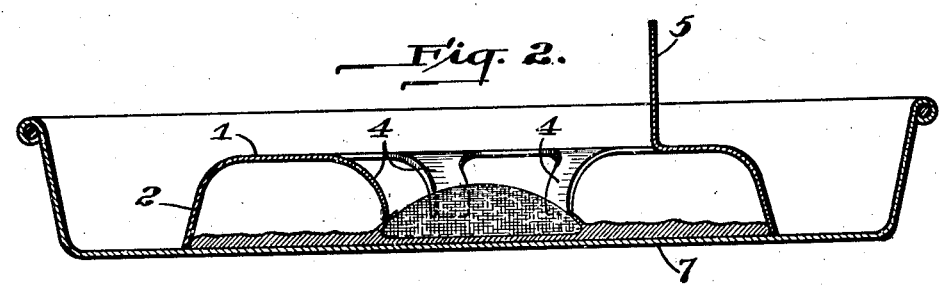
Fig. 2 is a sectional view on the line II—II of Fig. 1.

The preferred form of mold (Figs. 1 and 2) comprises a body portion 1 of any desired configuration provided with a downwardly-extending peripheral flange portion 2. The flange is preferably, but not necessarily, inclined at an angle to the vertical, as shown. The body portion 1 is provided with a central foodstuff-receiving aperture 3 around the periphery of which are arranged a series of downwardly extending inclined or curved prongs 4 adapted to serve as guiding and positioning means for guiding the yolk of an egg into a predetermined position with respect to the peripheral flange 2. A handle 5 is upstruck from the metal of the body portion 1.

It will be noted that the prongs 4 are of lesser depth than the peripheral flange 2, so that when the article is placed upon a flat cooking surface, as in a frying pan, the prongs do not touch the pan. That is to say, there is a certain amount of clearance between the lower ends of the prongs 4 and the cooking surface 7. Thus, when used for frying eggs,, the prongs will serve to correctly position the yolk of the egg but will not interfere in any way with the flow of the egg white outwardly to meet and take the shape of the flange 2.

Figure 3:
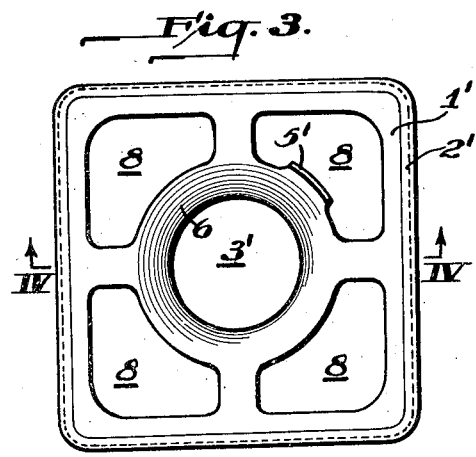
Fig. 3 is a plan view to a smaller scale of a modified form of mold.
Figure 4:
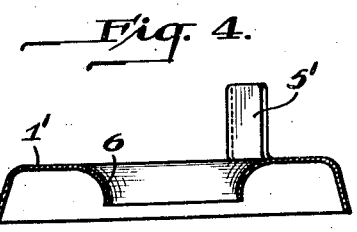
Fig. 4 is a sectional view on the line IV—IV of Fig. 3.

In the modification illustrated in Figs. 3 and 4 the separate prongs 4 are replaced by a continuous downwardly-extending curved or inclined peripheral flange 6. Otherwise the mold is similar to the preferred embodiment shown in Figs. 1 and 2, and is formed with a body portion 1' provided with a downwardly-extending peripheral outer flange portion 2' and an upstruck handle portion 5'. The peripheral flange 6 bordering the aperture 3' in the body portion may be referred to as the "inner" flange in contradistinction to the "outer" flange 2', and will be occasionally so referred to in the remainder of the specification and in the claims. The inner flange is of less depth than the outer flange. That is, the lower edge of the outer flange 2' lies in a plane which is below the plane of the lower edge of the inner flange 6, so that there is a certain amount of clearance between the lower edge of inner flange 6 and the cooking surface. The mold body 1' may, if desired, be provided with a plurality of apertures 8 through which the progress of cooking can be observed, and through which a fork or other utensil can be inserted if necessary to hold the egg or other foodstuff while the mold is withdrawn. In the preferred form illustrated in Figs. 1 and 2, the cut-out portions 9 between the prongs 4 perform the same function as apertures 8 in the modification just described.

It will be readily understood that fry molds embodying my invention can be formed from a single piece of sheet metal by ordinary and well known blanking, forming and trimming operations, and the ease with which they can be manufactured constitutes one of the advantages of my invention. The construction is such, moreover, that individual molds can be conveniently nested together when not in use, thus requiring a minimum amount of space in the drawer or kitchen cabinet.

If desired, a plurality of my improved molds may be used together in a single fry pan, as will be obvious. The molds may be separate or fastened together in any convenient manner to form a multiple-mold unit.

It will be seen that by my invention I have provided a mold which is simple and inexpensive to manufacture, which can be used as an accessory to the ordinary fry pan, and by the use of which the shape or configuration of an egg cooked therein may be controlled, while the yoke is centered or held in a predetermined position with respect to the white of the egg.

While in describing my invention I have, in the interest of clarity, employed specific language, I have no intention, in the use of such langauge, of excluding any equivalents or minor variations of the invention set forth.

I claim:

1. In a culinary utensil of the class described, a mold body provided with a downwardly-extending peripheral flange portion adapted to rest on a flat cooking surface, said mold body having a central foodstuff-receiving aperture, and inclined projections extending downwardly below the plane of said mold body to guide the foodstuff into a predetermined position with respect to said peripheral flange portion.

2. In a culinary utensil of the class described, an apertured mold body provided with downwardly-extending outer and inner flanges bordering respectively the periphery of said mold body and the periphery of the aperture therein, said inner flange having cut-out portions and the lower edge of the outer flange lying in a plane which is below the plane of the lower edge of the inner flange.

3. In a culinary utensil of the class described, a mold body provided with a downwardly-extending peripheral flange portion adapted to rest on a cooking surface, said mold body having a foodstuff-receiving aperture, and downwardly-extending curved prongs arranged around said aperture to guide the foodstuff into a predetermined position with respect to said peripheral flange portion.

4. In a culinary utensil of the class described, a mold body provided with a downwardly-extending peripheral flange portion adapted to rest on a cooking surface, said mold body having a foodstuff-receiving aperture, a plurality of inclined projections arranged around said aperture and extending downwardly below said mold body to a plane lying above the plane of the lower edge of the said peripheral flange portion, and an upstruck integral handle member.

JAMES K. MATTER.